March 12, 1957 O. VON ZELEWSKY 2,784,649
MACHINE TOOL FOR THE PRODUCTION OF BLADES OF
CENTRIFUGAL MACHINES
Filed Nov. 16, 1953 5 Sheets-Sheet 1

INVENTOR:
Ottomar von Zelewsky
BY
Richards Geier
ATTORNEYS

March 12, 1957  O. VON ZELEWSKY  2,784,649
MACHINE TOOL FOR THE PRODUCTION OF BLADES OF
CENTRIFUGAL MACHINES Filed Nov. 16, 1953  5 Sheets-Sheet 3

INVENTOR:
Ottomar von Zelewsky
BY
Richards Geier
ATTORNEYS

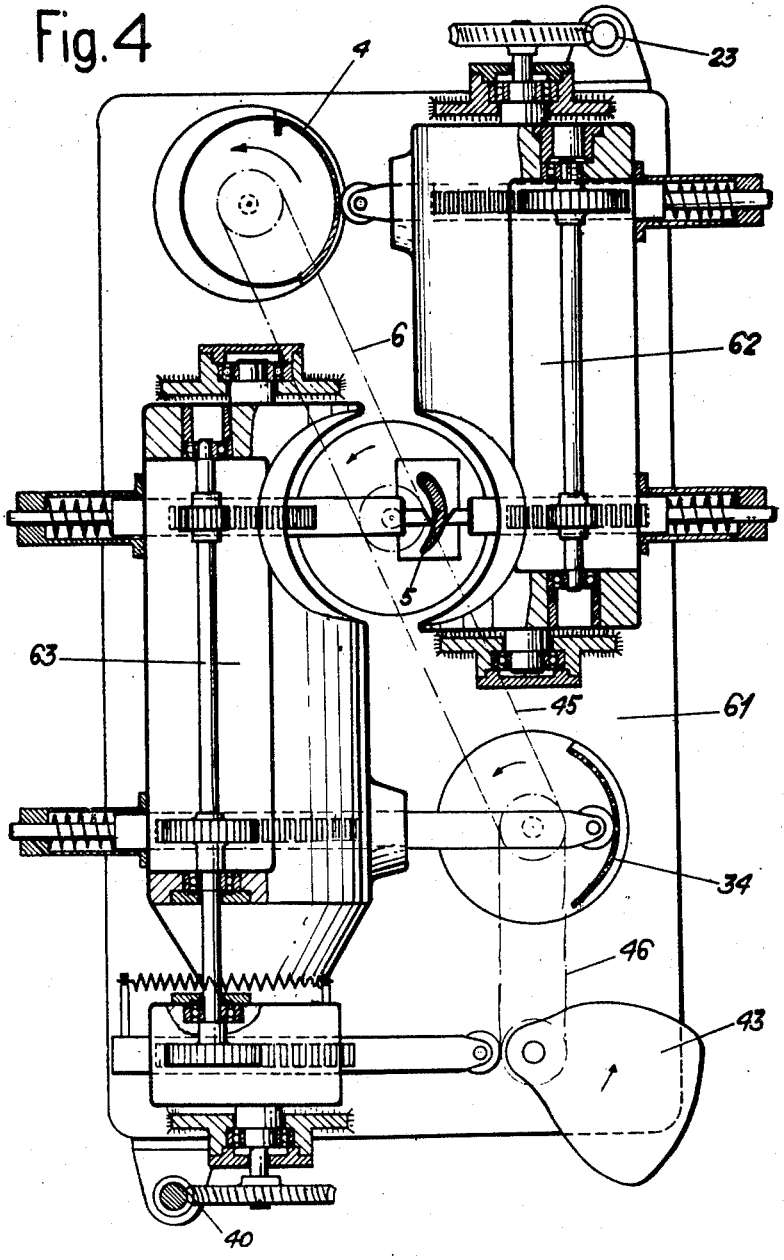

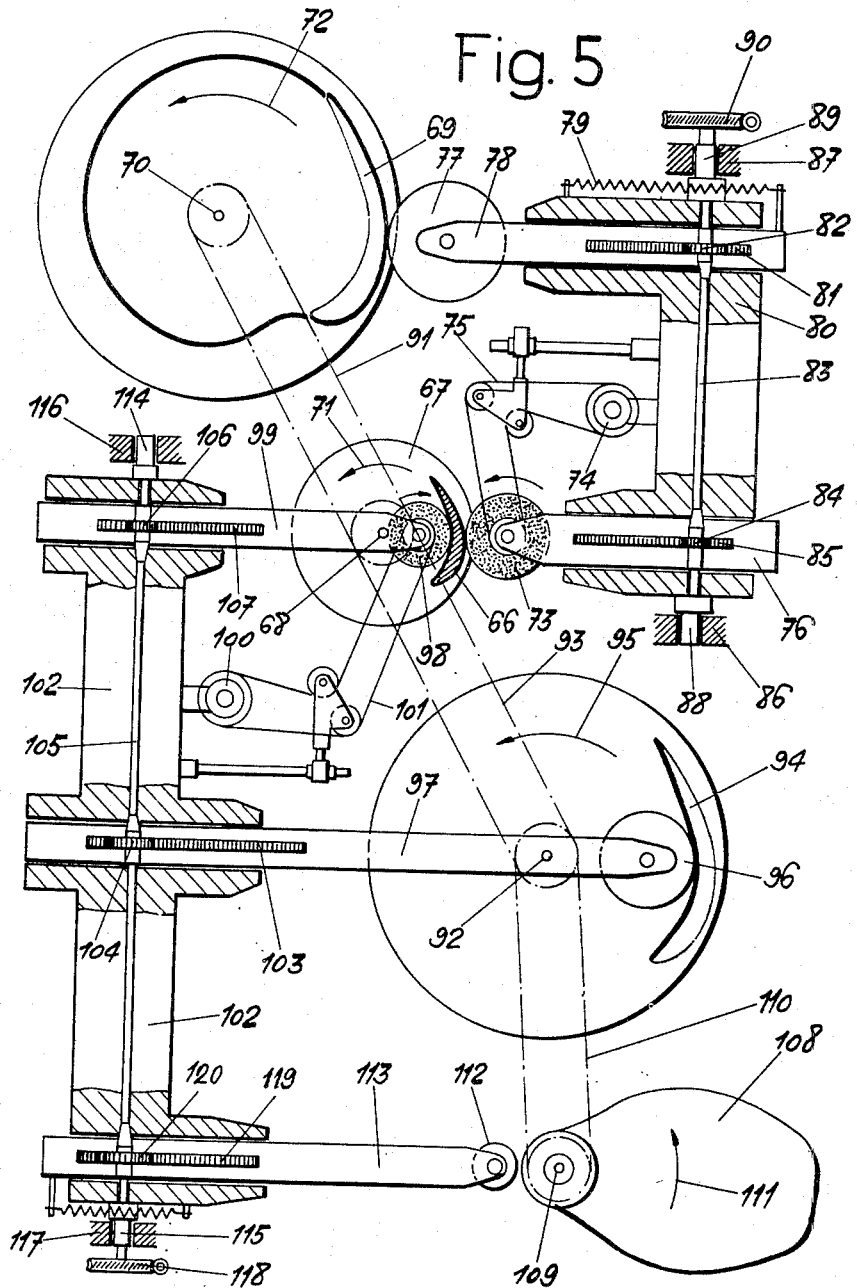

United States Patent Office 2,784,649
Patented Mar. 12, 1957

2,784,649

MACHINE TOOL FOR THE PRODUCTION OF BLADES OF CENTRIFUGAL MACHINES

Ottomar von Zelewsky, Neuhausen am Rheinfall, Switzerland, assignor to Georg Fischer Aktiengesellschaft, Schaffhausen, Switzerland, a Swiss company Application November 16, 1953, Serial No. 392,436

Claims priority, application Switzerland December 30, 1952

6 Claims. (Cl. 90—13.7)

The present invention relates to a machine tool for the production of individual blades of rotors of centrifugal machines by the copying method. Machine tools for copying blades, for example of gas turbines, in accordance with a template have already been constructed in such a manner that the blades and the template are rotated during the machining about parallel shafts extending in their longitudinal direction. Since the advance of the machining takes place parallel to the aforementioned axes of rotation or the workpiece and template, the machining of the blade root and also of a blade head which may be present offers great difficulties and heretofore, had to be carried out on separate machines. An object of the present invention is to eliminate these drawbacks.

The present invention differs from known constructions by the fact that the blades are machined by tools arranged on tool slides which are moved parallel to at least one feeler slide in a guide member which is adapted to pivot in the course of the feed in the direction of the blade axis about an axis intersecting the axes of rotation of the blade and the template. By means of a machine according to the present invention, the blade surfaces and the surfaces joining the blade root and blade head may be machined without detaching the blade.

Several examples of the use of the invention are shown in the drawing, wherein:

Figure 4 is a plan view of a machine for simultaneously machining the external and internal form of the blade by means of turning tools, Figure 5 is a plan view of a machine for simultaneously machining the internal and external forms of the blade by means of grinding discs.

Figure 1:
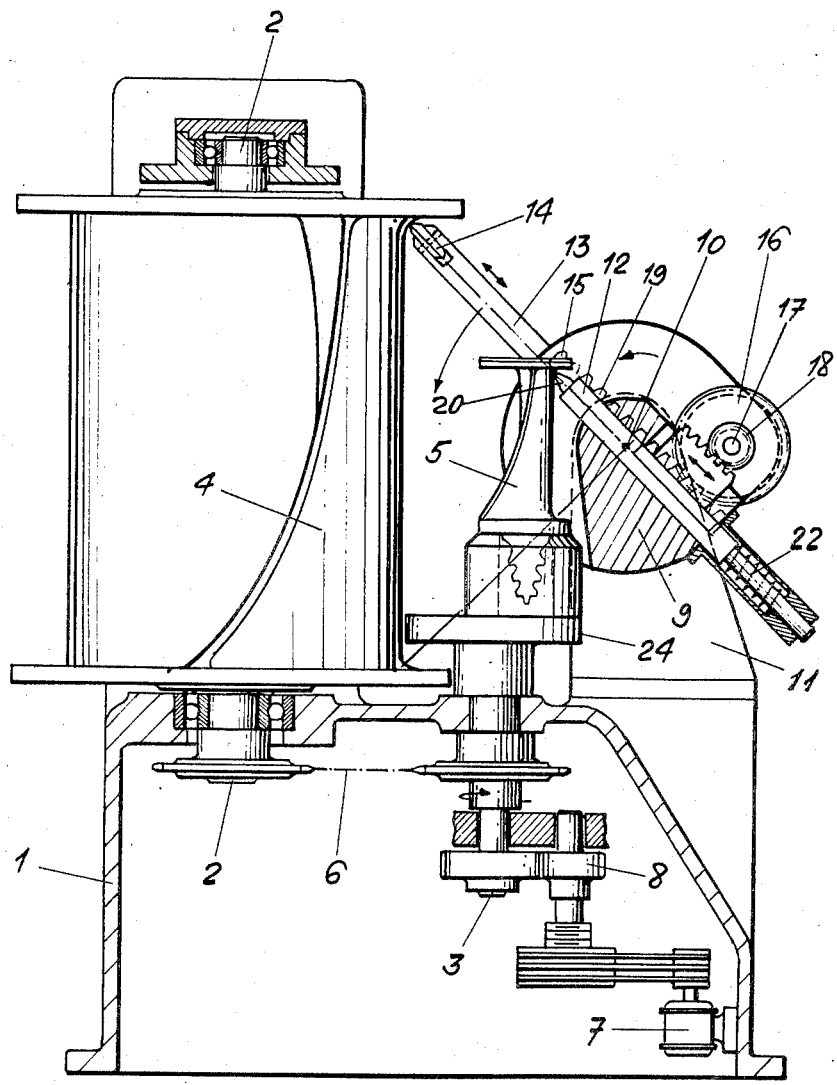
Figure 1 is a cross-section through a machine for machining the external form.
Figure 2:
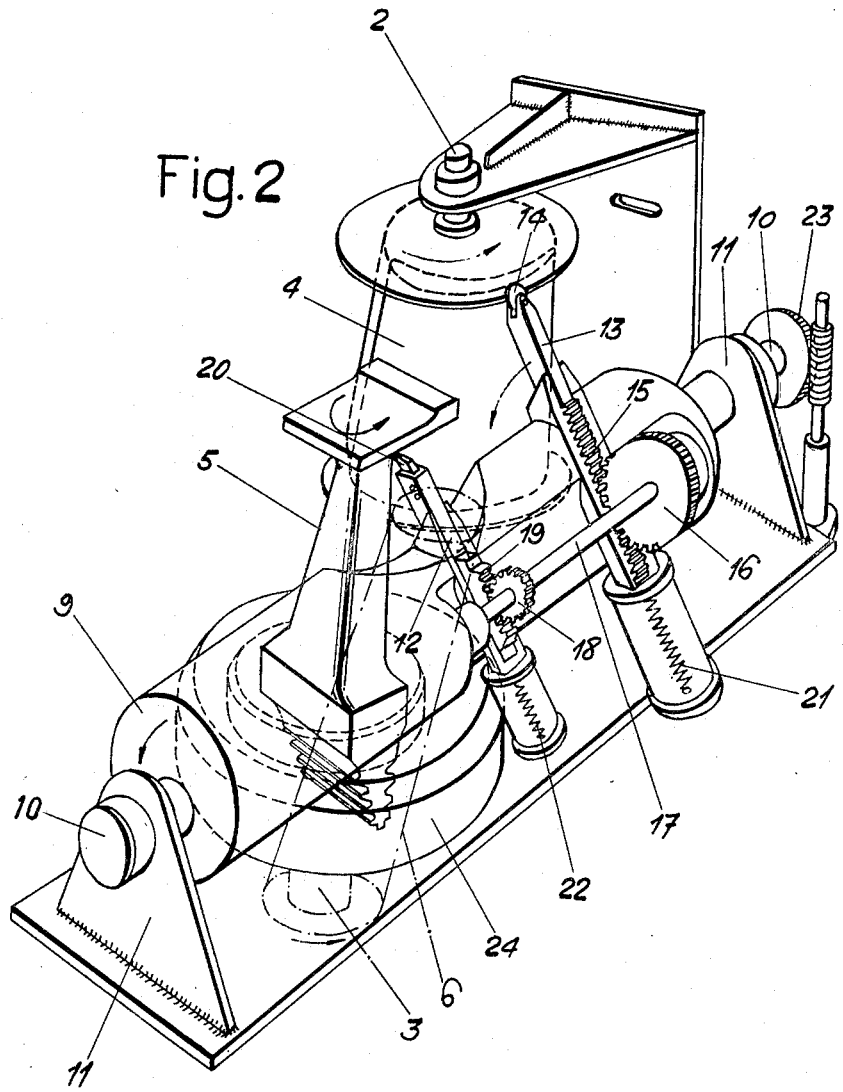
Figure 2 is a perspective view of the machine shown in Figure 1.

Figures 1 and 2 show a machine tool housing 1, the said housing having mounted therein shafts 2 and 3 parallel to one another. A template 4 is rotated about the shaft 2. Rotating about the shaft 3 is the workpiece 5 from which the blade form is to be machined according to the prototype of the template 4. The template 4 is on a larger scale in the ratio of 3:1. The shafts 2 and 3 are coupled with one another by a linked chain 6 so that they turn synchronously, being driven by the motor 7 and a gearing 8. The guide member 9 is pivotable about the shaft 10. The pivot shaft 10 is mounted in the two bearing members 11. Mounted in the guide member 9 are the tool slide 12 and the feeler slide 13. The feeler slide 13 is provided with a roller 14 which slides along on the template 4. A rack 15, connected fast with the feeler slide 13, meshes in the gear wheel 16 and transmits the movements of the feeler slide 13 through a shaft 17 to the gear wheel 18. The gear wheel 18 meshes in the rack 19, which is connected fast with the tool slide 12.

The tool slide 12 carries a turning tool 20 at its forward end. The diameters of the gear wheels 16 and 18 bear the same relationship to one another as the template 4 to the workpiece 5.

In the example shown in Figures 1 and 2, springs 21 and 22 are provided which move the feeler slide 13 and the tool slide 12 in the direction towards the template and the workpiece, respectively. The drive on the feeler slide and the tool slide represented by the springs 21 and 22, respectively, must operate at least on one of the aforementioned slides. The driving of the feeler slide and of the tool slide can be effected mechanically, pneumatically, hydraulically or electrically. The feed means for rocking the guide member 9 is represented by a worm-wheel drive 23.

The constructional example according to Figures 1 and 2 operates as follows:

After the template 4 has been clamped and the workpiece 5 has been secured on the table 24, the guide member 9 is set in the initial position for the machining operation. The pivot pin 10 of the guide member 9 is arranged approximately at the point of intersection of the bisectors of the angle of the head and root parts of the blade with the generatrix of the blade profile. In the position of the tool and feeler slides 12 and 13 as shown in Figures 1 and 2, the position of the bearing member 11 and of the pivot pin 10 relatively to the shafts 2 and 3 of the template 4 and the workpiece 5, respectively, is such that the maximum possible stroke of the two slides is formed in this position. This operation is effected in the usual manner and is therefore not shown in Figures 1 and 2. The machining operation on the blade head can commence after the adjustment of the pivot pin 10 of the guide member 9. The removal of material is now carried out with synchronous rotation of the template and the workpiece with mechanical feeling of the template, starting from the uppermost part of the blade head. The pivoting of the guide member 9, driven by the worm-wheel gearing 23 takes place uniformly. The machining operation in the constructional example of Figures 1 and 2 is effected as a turning operation with mechanical reproduction of the template 4, the feed in the direction of the axis of rotation of the template and the workpiece being effected by pivoting the guide member 9 through approximately 90°.

Figure 3:
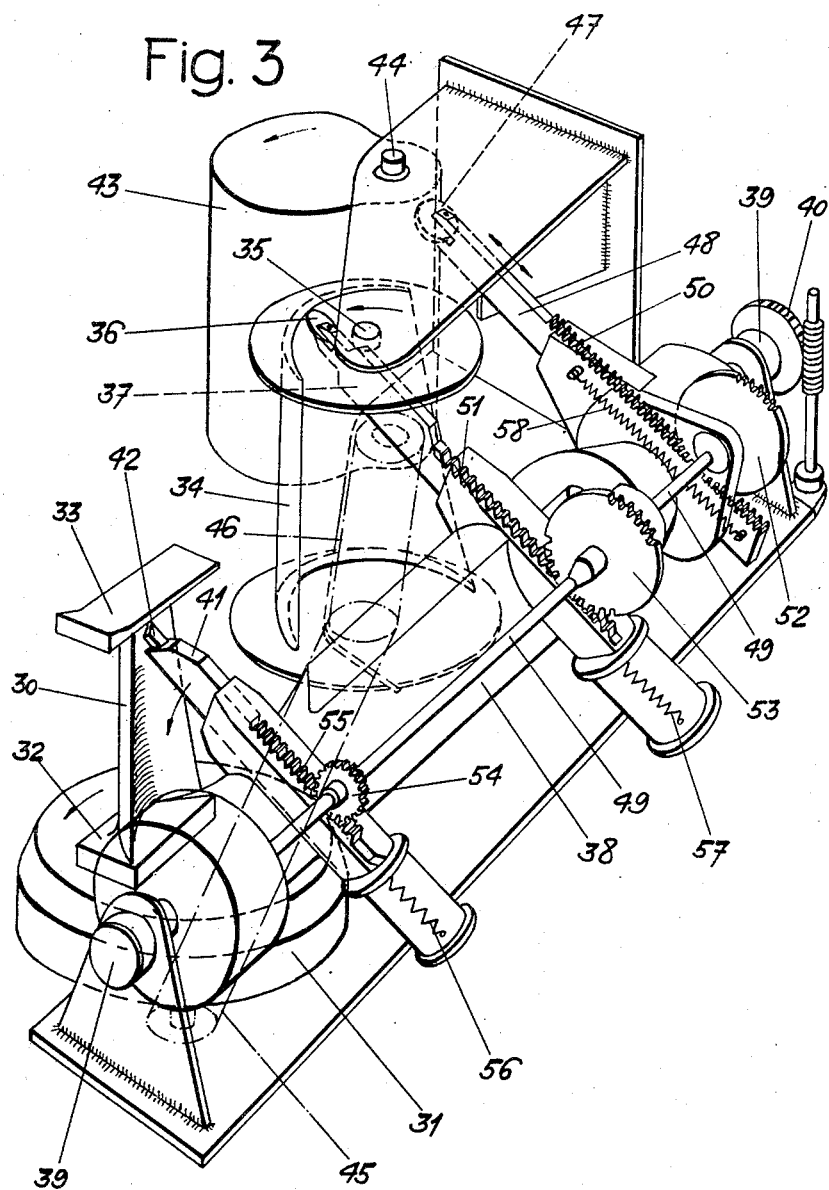
Figure 3 is a perspective view of the machine for machining the internal form.

Figure 3 is a perspective view of the machine for machining the internal shape of a blade 30. The blade 30 rotates on a clamping table 31 about an axis extending longitudinally thereof. 32 represents the blade root and 33 the blade head. The machining is carried out by the mechanical copying method in accordance with a template 34, which rotates synchronously about a shaft 35 extending parallel to the axis of rotation of the blade. The template 34 is explored by a feeler roller 36 which is arranged at the forward end of the feeler slide 37, which is arranged to move backwards and forwards in the guide member 38. The guide member 38 is capable of pivoting about its shaft 39. A wormwheel gearing 40 is provided for mechanically pivoting the guide member 30. Slidably arranged in the guide member 38 is the tool slide 41, which carries the tool 42 at its front end. Since both the feeler roller 36 and the tool 42 must be removed with each revolution from the space required for the rotation of the blade 30 or of the template 34, the entire copying assembly for machining the internal shape of the blade 30 is equipped with a withdrawal control. In the present constructional example as shown in Figure 3, the withdrawal control is effected by a separate cam member 43. The latter is rotated about a shaft 44 which is arranged parallel to the shafts 35 of the template 34 and the axis of rotation of the table 31. Linked chains 45 and 46 connect the three shafts mentioned above in such manner that they operate with exactly the same speed of rotation. A second feeler roller 47 explores the separate cam member 43. The feeler roller 47 is arranged at the forward end of the feeler slide 48. The feeler slide 48 can slide in the guide member 38, being reciprocated parallel to the feeler slide 37. Figure 3 shows the transmission of the movements of the feeler slides 37 and 48 to the shaft 49 by means of racks 50, 51 and pinions 52, 53 and to the tool slide 41 by means of a third pinion 54 and a rack 55. The driving force for the tool and feeler slides 41, 37 and 48 is supplied by springs 56, 57 and 58.

The operation of the machine tool according to Figure 3 is as follows:

The two feeler rollers 36, 47 operate jointly on the shaft 49 in order to control the tool slide 41 and the tool 42. During the phase illustrated in Figure 3, the feeler roller 36 operates for the purpose of mechanical reproduction of the internal shape of the blade 30 in accordance with the template 34. During this phase, the feeler roller 47 slides in the cylindrical portion of the cam 43. At the instant when the feeler roller 36 leaves the template 34, the feeler roller 47 takes over the control of the feeler slide 37, the feeler roller 36 and also of the tool slide 41 and the tool 42. The cam 43, which is rotated synchronously with the template 34, controls the feeler slide 37 and the tool slide 41 for a rapid withdrawal movement, which removes the feeler roller 36 and the tool 42 from the space required by the rotation of the template 34 and the blade 30. This controlled highspeed withdrawal movement is only necessary for copying the internal shape of the blade. The feeler slide 38 can be so adjusted that the feeler roller 47 does not contact the cam 43 as long as the feeler roller is exploring the template 34. The advance of the machining is also effected in this modification from the blade head 33 through the internal shape of the blade 30 to the blade root 32. The feed is mechanically operated by the wormwheel gearing 40 which is driven by a motor (not shown). During the machining of the internal shape of a blade, the guide member 38 carries out a rocking movement of approximately 90°.

Figure 4 is a plan view of a machine for simultaneously machining the external and internal forms of the blades by means of turning tools. This figure involves the combination of a copying device according to Figures 1 and 2 with a copying device according to Figure 3, in a single machine. With a machine in accordance with Figure 4, the external and internal form of the blades can be machined by two assemblies consisting of feeler slides and tool slides. Arranged on a common base plate 61 is a copying attachment 62 for machining the external shape of the blades. In Figure 4, the separate parts of the copying attachment 62 are provided with the same reference numerals as in Figures 1 and 2. The operation also corresponds exactly to the example of Figs. 1 and 2. The copying attachment 63 for machining the internal shape of the blades corresponds exactly to the constructional example according to Figure 3. Consequently, the separate parts of the copying attachment 63 are given the same reference numerals as in Figure 3. The two copying attachments 63 and 62 are coupled with one another by the chains 6, 45 and 46 and therefore operate synchronously. Furthermore, the two feed devices 23 and 40 are also coupled with one another, so that the machining of the blades 5 or 30 from inside and outside takes place uniformly and progressively and deformations of the blades are prevented by differently advanced turning tools. The driving motors for the rotating of the templates 4 and 34 and the blades 5 or 30 and also for the cam member 43 are not shown in Figure 4. The driving motors for the feeding devices 23 and 40 are also not shown in Figure 4.

No further explanations are necessary concerning the method of operation of the combined machine for producing blades in accordance with Figure 4, since the method of operation of the separate assemblies has already been fully described above.

Figure 5 shows a constructional example of the invention for simultaneously machining the external and internal shapes of blades by means of grinding discs. The blade 66 is clamped on a small turntable 67 and is rotatable therewith about a shaft 68. The template for the external shape 69 is rotatable about the shaft 70 which is arranged parallel to the shaft 68. The coupling of the two shafts 68 and 70 is effected by a chain 91. The direction of rotation of the blade 66 and the template 69 for the external shape is indicated by arrows 71 and 72. A grinding disc 73 is used as the tool for machining the blade 66. This grinding disc 73 is driven by a motor 74 and a belt gearing 75, and is mounted in the tool slide 76. The feeding of the grinding disc 73 towards the blade 66 is controlled by a feeler roller 77. In the constructional example illustrated, a spring 79 serves as the driving force for the feeler slide 78 and the tool slide 76. The tool slide 76 and the feeler slide 78 are both mounted in the guide member 80. The transmission of the movement of the feeler slide 78 to the tool slide 76 is effected by a rack 81 and a pinion 82 which meshes with the latter and the rotation of which is transmitted through the shaft 83 to a second pinion 84. The pinion 84 meshes with a rack 85 which is fixed to the tool slide 76. The guide member 80 with all parts secured thereon is rotatably mounted in the bearing members 86 and 87, by pins 88 and 89. A worm-wheel gearing 90 is provided in order to pivot the guide member 80 with the parts mounted therein and thereby to produce the feeding movement in the longitudinal axis of the blade.

The shaft 68 is also coupled with the shaft 92 by a chain 93. The shaft 92 also extends parallel to the shaft 68 and forms the axis of rotation of the template 94 for the internal shape of the blade 66. An arrow 95 indicates the direction of rotation of the template 94 about the shaft 92. The template 94 is explored by a feeler roller 96 which is rotatably mounted on the front end of a feeler slide 97. The machining of the internal shape of the blade 66 is effected by a grinding disc 98 which is rotatably arranged on the front end of the tool slide 99. The driving of the grinding disc 98 is effected by the motor 100 by means of a belt gearing 101. The feeler slide 97 and the tool slide 99 are mounted for longitudinal displacement in the guide member 102. The transmission of the movements of the feeler slide 97 to the tool slide 99 is effected through a rack 103 secured to the feeler slide 97 and a pinion 104 meshing with said rack. The pinion 104 is coupled with the pinion 106 by means of a shaft 105. The pinion 106 meshes with a rack 107 which is secured to the tool slide 99. Since in the turning movement of the blade 66 and the template 94 for the internal shape, the grinding disc 98 and the feeler roller 96 with each rotation must be removed once from the range of rotation of the blade 66 and the template 94, there is provided a separate cam member 108. The cam 108 is rotatable about a shaft 109 which is arranged parallel to the shaft 92 and is coupled therewith by a chain 110. The direction of rotation of the cam 108 is indicated by the arrow 111. During the interval in rotation in which the tool 98 is not operating, the cam 108 is explored by a feeler roller 112. The feeler roller 112, coupled with the grinding disc 98 through the shaft 105 by means of the rack 119 and a pinion 120, is mounted at the forward end of a slide 113 which is likewise arranged to be displaceable longitudinally in the guide member 102 parallel to the feeler slide 97 and the tool slide 99. The guide member 102 has two journals 114 and 115 and is pivotally mounted in the bearings 116 and 117. A worm wheel gearing 118 effects the pivotal movement of the guide member 102 in order to guide the feeler rollers 96 and 112 and also the grinding disc 98 in a downward direction. The drive of the templates 69 and 94, the blade 66 and the cam 108 is effected in known manner by a motor which is not shown in Figure 5. The drive of the worm wheel 90 and 118 which simultaneously with one another operate the feeding for the internal and external machining of the blade is also effected by a motor, which is not shown in Figure 5.

The method of operation of the machine shown in Figure 5 takes place in exactly the same manner as already described above for machining the external form of the blades according to Figures 1 and 2 and for the machining of the internal form of the blades according to Figure 3.

Instead of using the turning tools or grinding discs shown in the constructional examples of the drawings, it is also possible to employ other tools for machining the blades, for example, rotating millers or suitable broaching tools. Similarly, in all constructional form of the machine, it is possible to carry out the drive of the slides for feelers and for the tools by electrical hydraulic or penumatic means instead of by purely mechanical means. The number of blades to be produced simultaneously by having one template for each internal or external shape is not limited to one, but can be increased within certain limits.

Instead of the combination of template and cam for copying the internal shape of the blade, as illustrated, it is possible to arrange a single combined template member, one half of which, as a convex template produces the internal form of the blade, while the other half effects the withdrawal of the tool from the path of movement of the blade.

Figures 1 to 5 show blades in which the head and root portions are disposed in vertical planes relatively to the longitudinal axis of the blade. With a machine in accordance with the present invention, however, it is also possible to produce blades which have surfaces arranged obliquely to the longitudinal axis of the blade, both in the head portion and in the root portion. With the known machines for the same purpose, such blades could not be produced in a single operation.

I claim:

1. A template-copying machine tool for making individual rotor blades of centrifugal machines, said machine tool comprising a housing, means firmly connected with said housing for rotating a template about a fixed longitudinal axis, means firmly connected with said housing for rotating a work piece about a fixed longitudinal axis, the two axes being stationary and extending parallel to each other, a guide member swingably mounted in said housing, a feeler slide adapted to carry a feeler for engaging the template, said feeler slide being mounted upon said guide member for movement transverse to said guide member, a tool slide adapted to carry a tool for machining the workpiece, said tool slide being mounted upon said guide member for movement transverse to said guide member, and means connected with said feeler slide and said tool slide for jointly moving them in the transverse direction parallel to each other and transmitting movements of the feeler to the tool for corresponding movements, whereby said swinging of the guide member carrying the tool which engages the surface of the workpiece constitutes the machining feed in a plane passing through the longitudinal axis of the workpiece.

2. A template-copying machine tool for making individual rotor blades of centrifugal machines, said blades having head and root portions, said machine tool comprising a housing, means firmly connected with said housing for rotating a template about a fixed longitudinal axis, means firmly connected with said housing for rotating a workpiece about a fixed longitudinal axis, the two axes being stationary and extending parallel to each other, a guide member mounted in said housing to swing about an axis which is located substantially at the point of intersection of the bisectors of the angles of the head and root portions of the blade with the generatrix of the blade profile, a feeler slide adapted to carry a feeler for engaging the template, said feeler slide being mounted upon said guide member for movement transverse to said guide member, a tool slide adapted to carry a tool for machining the workpiece, said tool slide being mounted upon said guide member for movement transverse to said guide member, and means connected with said feeler slide and said tool slide for jointly moving them in the transverse direction parallel to each other and transmitting movements of the feeler to the tool for corresponding movements, whereby said swinging of the guide member carrying the tool which engages the surface of the workpiece constitutes the machining feed in a plane passing through the longitudinal axis of the workpiece.

3. A template-copying machine tool for making individual rotor blades of centrifugal machines, said machine tool comprising a housing, means firmly connected with said housing for rotating a template about a fixed longitudinal axis, means firmly connected with said housing for rotating a workpiece about a fixed longitudinal axis, the two axes being stationary and extending parallel to each other, a guide member swingably mounted in said housing, a feeler slide adapted to carry a feeler for engaging the template, said feeler slide being mounted upon said guide member for movement transverse to said guide member, a tool slide adapted to carry a tool for machining the workpiece, said tool slide being mounted upon said guide member for movement transverse to said guide member, a gear drive connected with said feeler slide for causing transverse movement of said feeler slide, a separate gear drive connected with said tool slide for causing transverse movement of said tool slide, and means firmly interconnecting the two gear drives for transmitting movements of the feeler to the tool for corresponding movements, whereby said swinging of the guide member carrying the tool which engages the surface of the workpiece constitutes the machining feed in a plane passing through the longitudinal axis of the workpiece.

4. A template-copying machine tool for making individual rotor blades of centrifugal machines, said machine tool comprising a housing, means firmly connected with said housing for rotating a template about a fixed longitudinal axis, means firmly connected with said housing for rotating a workpiece about a fixed longitudinal axis, the two axes being stationary and extending parallel to each other, a guide member swingably mounted in said housing, a first feeler slide adapted to carry a feeler for engaging a template to reproduce the contour of the template, a tool slide adapted to carry a tool for machining the workpiece, said tool slide being mounted upon said guide member for movement transverse to said guide member, a second feeler slide adapted to carry a feeler for controlling in and out movement of the tool slide, said feeler slides being mounted upon said guide member for movement transverse to said guide member, means connected with said feeler slides and said tool slide for jointly moving them parallel to each other in transverse direction and transmitting movements of the feelers to the tool for corresponding movements, whereby said swinging of the guide member carrying the tool which engages the surface of the workpiece constitutes machining feed in a plane passing through the longitudinal axis of the workpiece, and a separate cam member carried by the housing and engaged by the feeler of the second feeler slide for moving said first feeler slide and tool slide away from the template and the workpiece, respectively, after each cutting operation.

5. A template-copying machine tool for making individual rotor blades of centrifugal machines, said machine tool comprising a housing, means firmly connected with said housing for rotating two templates about fixed longitudinal axes, means rotating a workpiece about a fixed longitudinal axis, said longitudinal axes being stationary and exending parallel to each other, a guide member swingably mounted in said housing, a first feeler slide adapted to carry a feeler for engaging an outer surface of one of said templates, said first feeler slide being mounted upon said guide member for transverse movement to said guide member, a first tool slide adapted to carry a tool for machining an outer surface of the workpiece, said tool slide being mounted upon said guide member for movement transverse to said guide member, means connected with said first feeler slide and said first tool slide for moving them jointly parallel to each other in transverse direction, a second guide member swingably mounted in said housing, a second feeler slide adapted to carry a feeler for engaging an inner surface of the other one of said templates, said second feeler slide being mounted upon said second guide member for movement transverse to said second guide member, a second tool slide adapted to carry a tool for machining an inner surface of the workpiece, said second tool slide being mounted upon said second guide member for movement transverse to said second guide member, means connected with said second feeler slide and said second tool slide for moving them jointly parallel to each other in transverse direction, and means interconnecting the third-mentioned and the fourth-mentioned means.

6. A template-copying machine tool for making individual rotor blades of centrifugal machines, said machine tool comprising a housing, means firmly connected with said housing for rotating a template about a fixed longitudinal axis, means firmly connected with said housing for rotating another template about a fixed longitudinal axis, said other template extending parallel to the first-mentioned template and rotating synchronously therewith, means rotating a workpiece about a longitudinal axis, said longitudinal axes being stationary and extending parallel to each other, a guide member swingably mounted in said housing, a first feeler slide adapted to carry a feeler for engaging an outer surface of the first-mentioned template, said first feeler slide being mounted upon said guide member for movement transverse to said guide member, a first tool slide adapted to carry a tool for machining an outer surface of the workpiece, said tool slide being mounted upon said guide member for movement transverse to said guide member, means connected with said first feeler slide and said first tool slide for moving them jointly parallel to each other in transverse direction, a second guide member swingably mounted in said housing, a second feeler slide adapted to carry a feeler for engaging an inner surface of the other one of said templates, said second feeler slide being mounted upon said second guide member for movement transverse to said second guide member, a second tool slide adapted to carry a tool for machining an inner surface of the workpiece, said second tool slide being mounted upon said second guide member for movement transverse to said second guide member, means connected with said second feeler slide and said second tool slide for moving them jointly parallel to each other in transverse direction, and means inter-connecting the fourth-mentioned and fifth-mentioned means.

References Cited in the file of this patent

UNITED STATES PATENTS

| | | |
|---|---|---|
| 1,634,550 | Melling | July 5, 1927 |
| 2,005,508 | Shaw | June 18, 1935 |
| 2,113,716 | Berliner | Apr. 12, 1938 |
| 2,204,696 | Ratie | June 18, 1940 |
| 2,610,447 | Bobbs | Sept. 16, 1952 |